(12) United States Patent
Wang

(10) Patent No.: US 11,913,438 B2
(45) Date of Patent: Feb. 27, 2024

(54) AIR INFLATION DEVICE

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 366 days.

(21) Appl. No.: 17/147,750

(22) Filed: Jan. 13, 2021

(65) Prior Publication Data
US 2021/0215262 A1   Jul. 15, 2021

(30) Foreign Application Priority Data

Jan. 14, 2020 (TW) ................................. 109200521

(51) Int. Cl.
| | | |
|---|---|---|
| F04B 33/00 | (2006.01) | |
| F04B 53/16 | (2006.01) | |
| F04B 39/00 | (2006.01) | |
| F04B 39/12 | (2006.01) | |
| G01L 7/16 | (2006.01) | |

(52) U.S. Cl.
CPC .......... *F04B 33/00* (2013.01); *F04B 39/0005* (2013.01); *F04B 39/121* (2013.01); *F04B 39/123* (2013.01); *F04B 53/16* (2013.01); *G01L 7/166* (2013.01)

(58) Field of Classification Search
CPC .... F04B 33/00; F04B 39/0005; F04B 39/121; F04B 39/123; F04B 53/14; F04B 53/144; F04B 53/16; F04B 33/005; G01L 7/166; G01L 7/16; G01L 7/185; G01L 17/00; F16K 15/20
See application file for complete search history.

(56) References Cited

U.S. PATENT DOCUMENTS

| | | | | |
|---|---|---|---|---|
| 2010/0104453 A1* | 4/2010 | Wu | ........................ | F04B 33/005 417/63 |
| 2016/0076534 A1* | 3/2016 | Chou | ..................... | F04B 33/005 73/168 |
| 2016/0097383 A1* | 4/2016 | Chou | ...................... | F04B 39/10 417/63 |

FOREIGN PATENT DOCUMENTS

| | | | | |
|---|---|---|---|---|
| CN | 109488558 | * | 3/2019 | .............. F04B 33/00 |
| DE | 202005011540 | * | 11/2005 | ............. F04B 33/005 |

OTHER PUBLICATIONS

DE202005011540 translation (Year: 2023).*
CN109488558 translation (Year: 2023).*

* cited by examiner

*Primary Examiner* — Charles G Freay
*Assistant Examiner* — David N Brandt
(74) *Attorney, Agent, or Firm* — MUNCY, GEISSLER, OLDS & LOWE, PC (57) ABSTRACT

An air inflation device includes an inflation unit defining an interior space, a handgrip unit connected to the inflation unit, and a pressure measuring mechanism disposed in the handgrip unit and including a first tubular member defining a receiving space, and a second tubular member defining a flow guide channel that has an air inlet communicating with the interior space, and an air guide hole communicating with the receiving space. A measuring unit is disposed in the receiving space and has a free end pushed to move relative to the first tubular member by air entering the receiving space from the flow guide channel. An indicating unit indicates a position of the free end in the first tubular member.

7 Claims, 12 Drawing Sheets

AIR INFLATION DEVICE

CROSS-REFERENCE TO RELATED APPLICATION

This application claims priority of Taiwanese Patent Application No. 109200521, filed on Jan. 14, 2020.

FIELD

The disclosure relates to an air inflation device that can facilitate viewing of a pressure value of an inflatable object.

BACKGROUND

Figure 1:
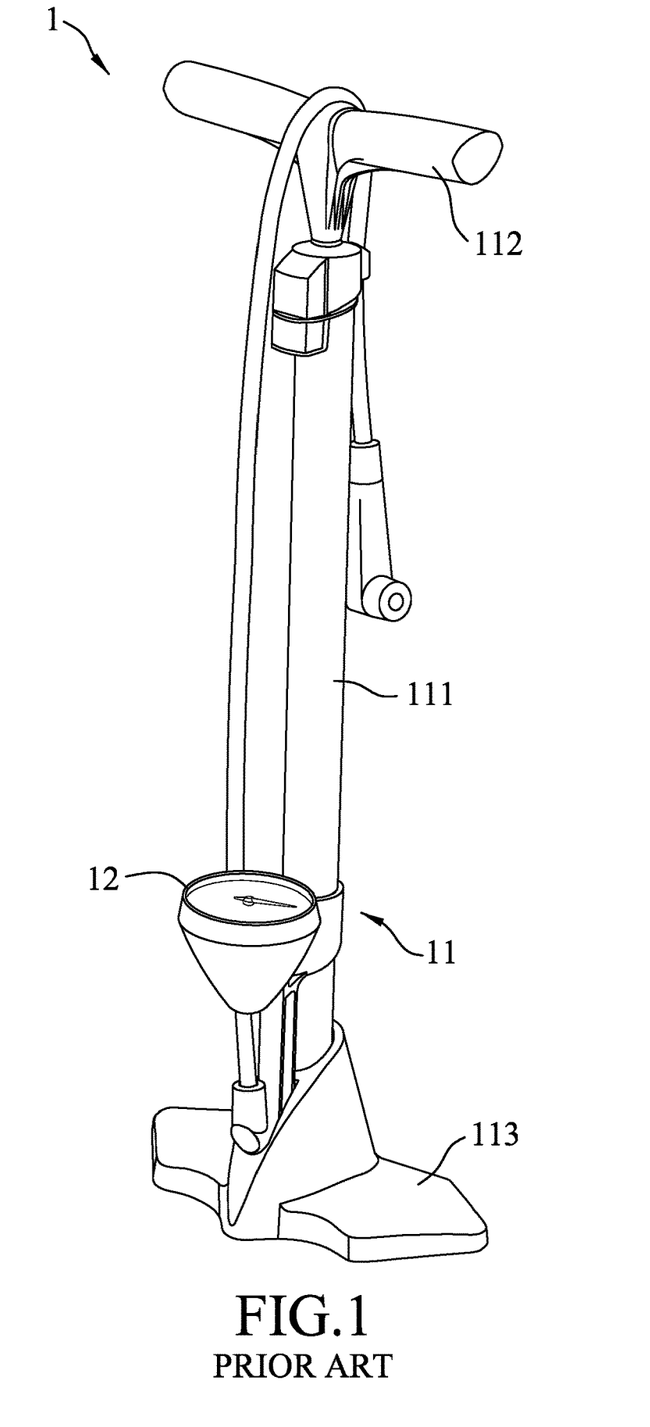
FIG. 1 is a perspective view of a conventional air inflation device.

Referring to FIG. 1, a conventional air inflation device 1 includes an inflation mechanism 11 suitable for inflating air into an inflatable object (not shown), and a disc-shaped pressure gauge 12 mounted on the inflation mechanism 11 for measuring the pressure in the inflatable object. The inflation mechanism 11 includes an inflation unit 111 having a bottom side connected with the pressure gauge 12, a handgrip unit 12 connected to a top side of the inflation unit 111, and a foot plate unit 113 connected to the bottom side of the inflation unit 111.

In use, a user steps on the foot plate unit 113 with his/her feet, and pulls up and down the handgrip unit 112 with his/her hands to inflate air into the inflatable object through the inflation unit 111. During inflation, the pressure inside the inflatable object can be measured using the pressure gauge 12.

However, since the pressure gauge 12 is located on the bottom side of the inflation unit 111, since the user usually is in a standing position when inflating the inflatable object, and since the needle of the pressure gauge 12 indicates the measured pressure value in a rotating manner, the user usually needs to bend over to observe the angular movement of the needle of the pressure gauge 12 within the appropriate visual focus (for example: 30 cm to 50 cm) and read the pressure value indicated on the pressure gauge 12. Thus, the conventional air inflation device 1 is very inconvenient to use.

SUMMARY

Therefore, an object of the present disclosure is to provide an air inflation device that can alleviate at least one of the drawbacks of the prior art.

According to the present disclosure, an air inflation device suitable for inflating air into an inflatable object comprises an inflation mechanism including an inflation unit and a handgrip unit. The inflation unit defines an interior space, and has an inflation hole for allowing air to be inflated into the inflatable object. The handgrip unit extends along a longitudinal direction and is connected to the inflation unit. A pressure measuring mechanism is disposed in the handgrip unit and includes a flow guide unit, a measuring unit and an indicating unit. The flow guide unit includes a first tubular member that defines a receiving space, and a second tubular member connected to the first tubular member and defining a flow guide channel. The flow guide channel has an air inlet communicating with the interior space, and an air guide hole communicating with the receiving space.

The measuring unit is disposed in the receiving space and has a free end that is pushed to move relative to the first tubular member along the longitudinal direction by air entering the receiving space from the flow guide channel. The measuring unit includes an elastic member that is retractable when pushed, and an end plug fixed to the first tubular member and connected to the elastic member. The free end is opposite to the end plug. The indicating unit extends along the longitudinal direction and is configured to indicate a position of the free end of the measuring unit in the first tubular member.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Before the present disclosure is described in greater detail with reference to the accompanying embodiments, it should be noted herein that like elements are denoted by the same reference numerals throughout the disclosure.

Referring to FIGS. 2 to 6, an air inflation device 100 according to the first embodiment of the present disclosure is suitable for inflating an inflatable object (not shown), such as a tire, an inflatable cushion, an inflatable pool, etc., through an inflation tube 9. The air inflation device 100 includes an inflation mechanism 2 and a pressure measuring mechanism 3.

The inflation mechanism 2 includes an inflation unit 21, a handgrip unit 22, and a switching unit 23. The inflation unit 21 includes a cylinder 211 extending along an axis (L1) and defining an interior space 214 extending along a length thereof, a piston structure 212 disposed in the interior space 214, and two foot plates 213 extending horizontally, outwardly and oppositely from a bottom side of the cylinder 211. The interior space 214 has a top opening 215 formed in a top end of the cylinder 211. The cylinder 211 has a connecting portion 226 disposed on the top end thereof, and a vent hole 200 communicating with the interior space 214 and proximate to the top opening 215. The connecting portion 226 has a tubular section 227 adapted for connection with the inflation tube 9 and defining an inflation hole 210.

Figure 4:
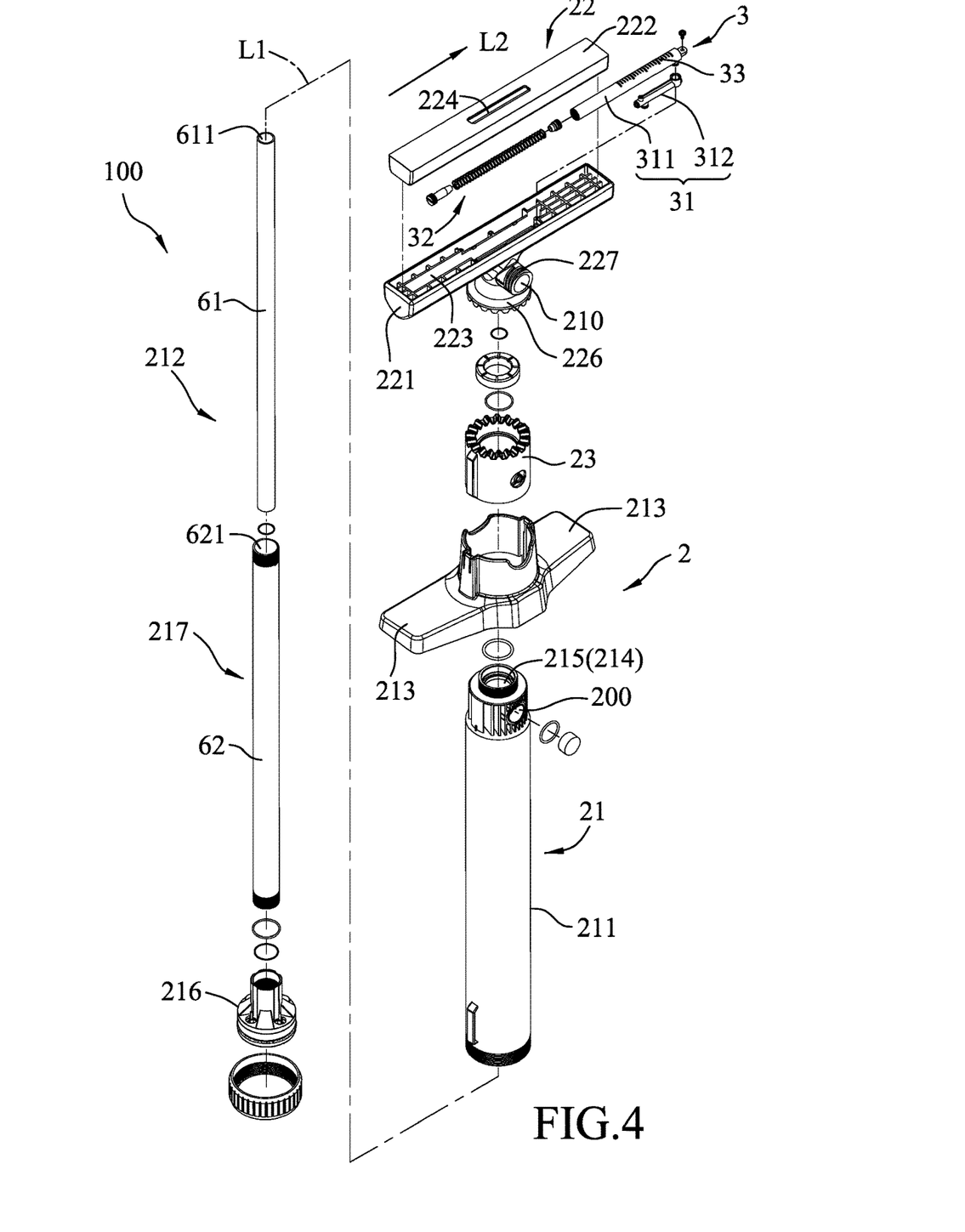
FIG. 4 is an exploded perspective view of the first embodiment.
Figure 6:
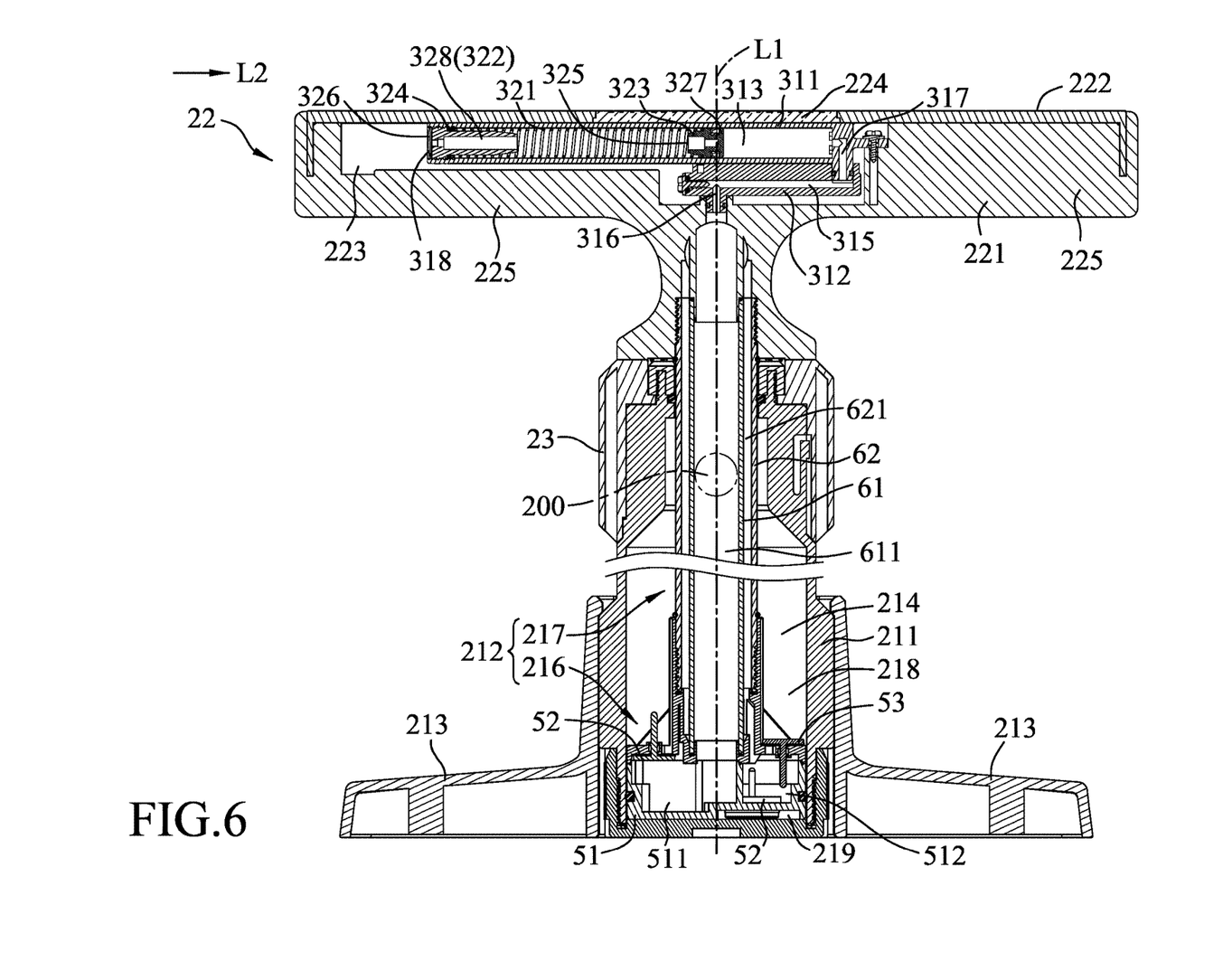
FIG. 6 is a fragmentary assembled sectional view of the first embodiment.

The piston structure 212 includes a piston assembly 216, and a piston rod 217 extending through the top opening 215 and connected to the piston assembly 216 for driving the piston assembly 216 to move up and down in the interior space 214. The piston assembly 216 includes a piston 51 dividing the interior space 214 into a first interior portion 218 and a second interior portion 219, two first valve members 52 disposed in the piston 51, and two second valve members 53 (only one is shown in FIG. 6) also disposed in the piston 51. The piston 51 defines a first valve chamber 511 and a second valve chamber 512 communicating with the first interior portion 218 and the second interior portion 219. Each first valve member 52 and a corresponding one of the second valve members 53 are used for opening and closing each of the first and second valve chambers 511, 512. Since the piston structure 212 is not the main focus of improvement of this disclosure, it will not be described here in further detail.

The piston rod 217 includes a first rod component 61 defining a first passage 611 and having a bottom end connected to the piston 51, and a second rod component 62 sleeved on the first rod component 61 and having a bottom end also connected to the piston 51. The first and second rod components 61, 62 cooperatively define a second passage 621. The first passage 611 communicates with the first valve chamber 511, while the second passage 621 communicates with the second valve chamber 512. The inflation hole 210 is located above and communicates with the first passage 611 for allowing air in the first passage 611 to be inflated into the inflatable object through the inflation tube 9.

Figure 2:
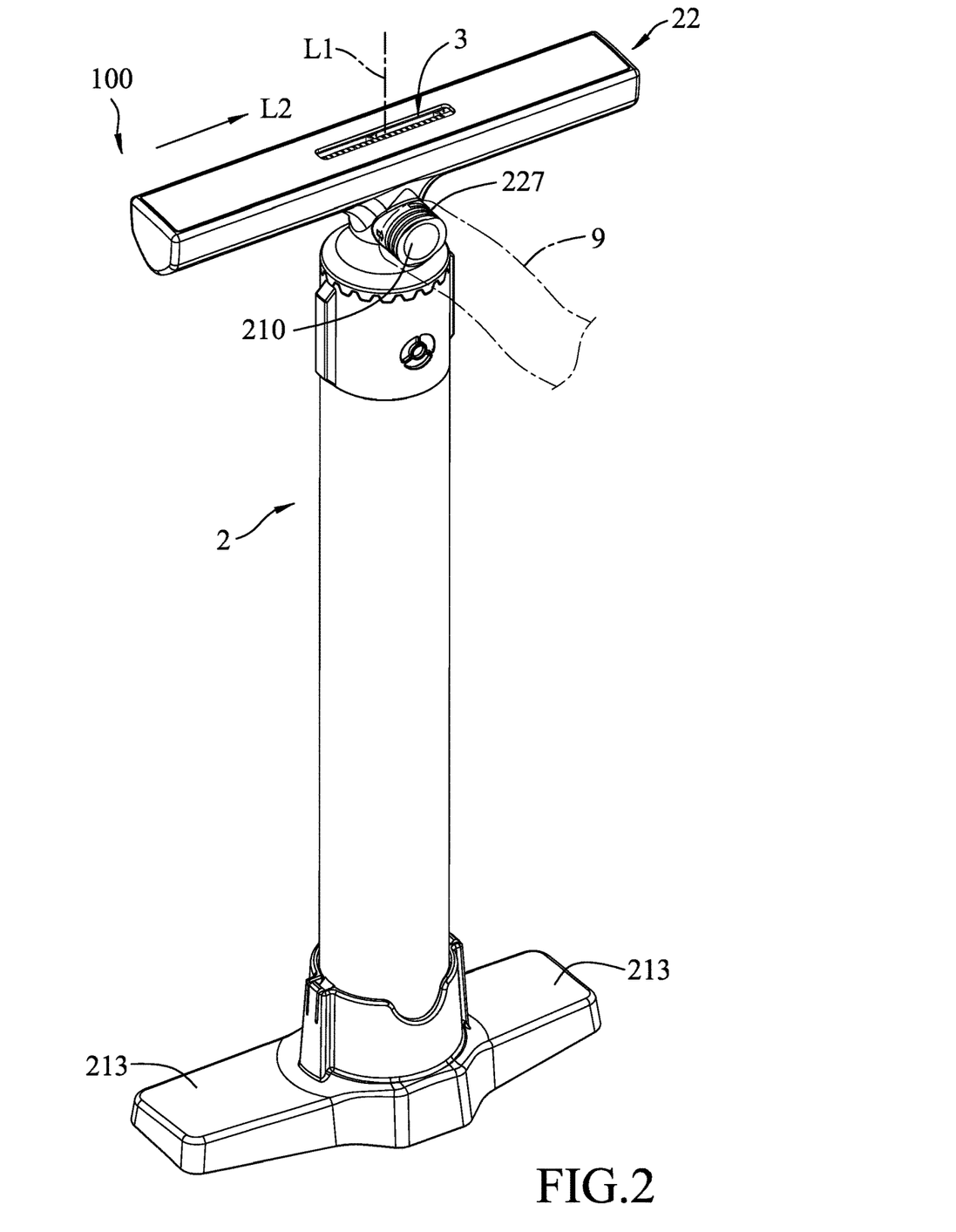
FIG. 2 is a perspective view of an air inflation device according to the first embodiment of the present disclosure.
Figure 3:
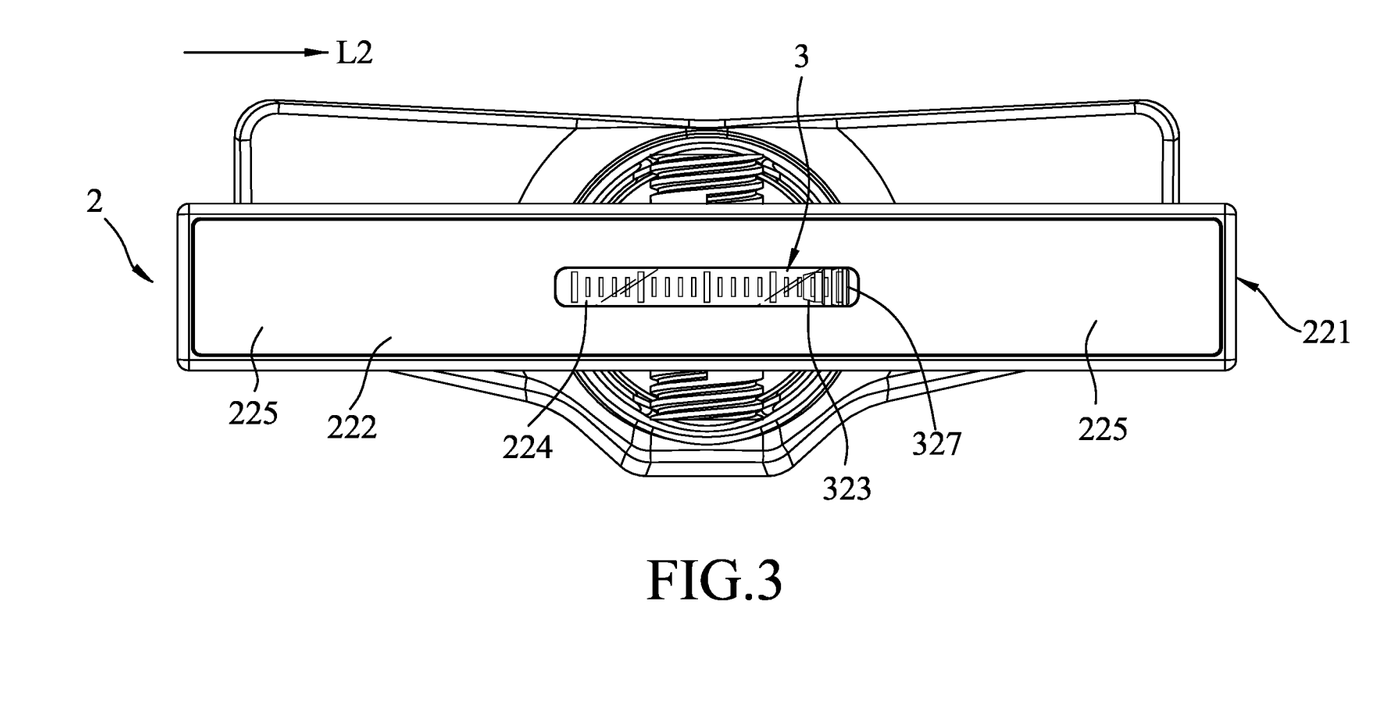
FIG. 3 is a schematic top view of the first embodiment.

The handgrip unit 22 has a handgrip housing 221 extending along a longitudinal direction (L2) transverse to the axis (L1) and integrally connected to the connecting portion 226 of the cylinder 211. The handgrip housing 221 defines a mounting space 223 extending along the longitudinal direction (L2), and has a viewing window 224 formed in a central portion of atop surface 222 thereof, and two handgrip portions 225 opposite to each other along the longitudinal direction (L2). The viewing window 224 is located between the handgrip portions 225, and permits viewing of an interior of the mounting space 223.

The switching unit 23 is rotatably connected to a top side of the cylinder 211, and is rotatable relative to the cylinder 211 between a two-way inflation position that closes the vent hole 200 and a one-way inflation position that opens the vent hole 200. The connecting portion 226 is removably engaged to a top end of the switching unit 23. Top ends of the first and second rod components 61, 62 extend through the top opening 215, and are connected to an inner portion of the connecting portion 226.

Figure 5:
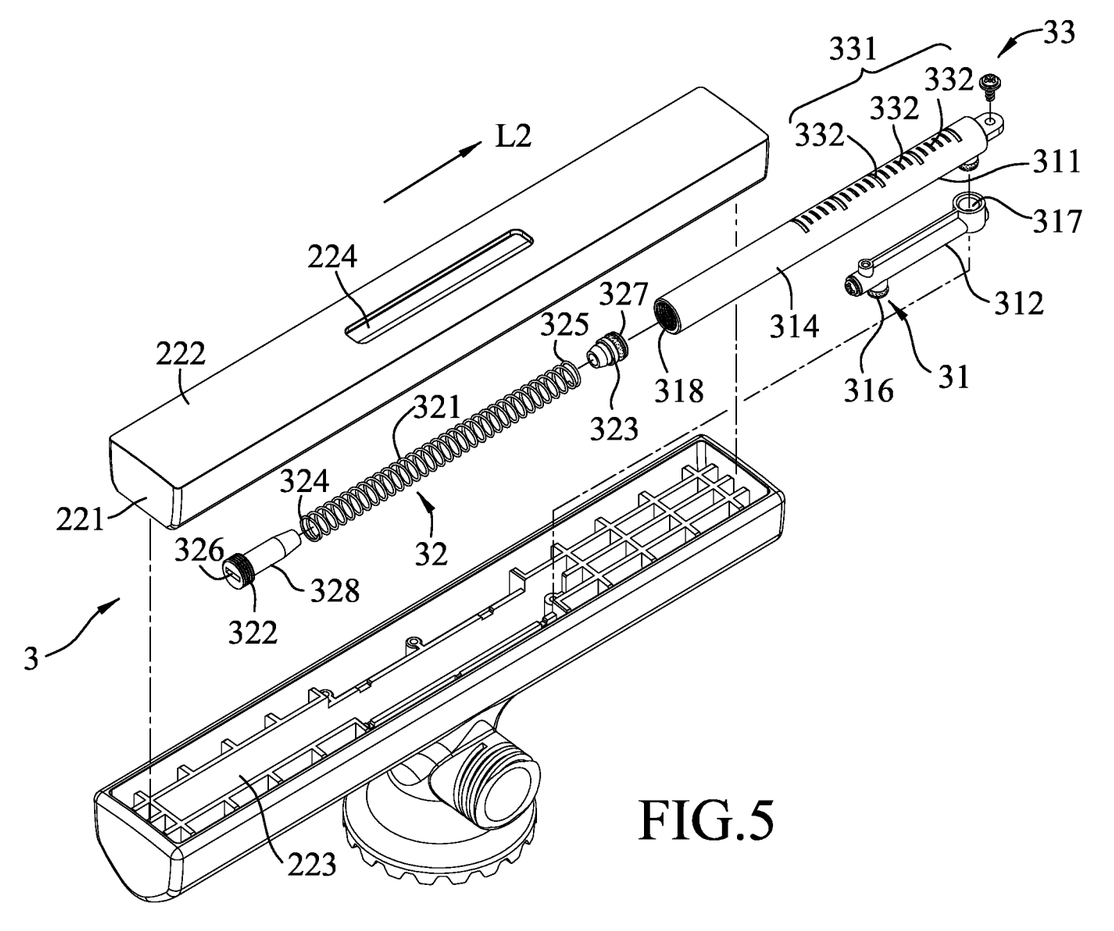
FIG. 5 is an enlarged view of a portion of FIG. 4.

The pressure measuring mechanism 3 is disposed in the mounting space 223 of the handgrip housing 221, and includes a flow guide unit 31, a measuring unit 32 and an indicating unit 33.

The flow guide unit 31 includes a first tubular member 311 that is transparent and that defines a receiving space 313, and a second tubular member 312 connected to and disposed below the first tubular member 311. The second tubular member 312 defines a flow guide channel 315 having an air inlet 316 that is located above the interior space 214, that communicates with the top opening 215 of the interior space 214 through the connecting portion 226 and that extends along the axis (L1), and an air guide hole 317 communicating with the receiving space 313 and staggered with the air inlet 316. The receiving space 313 has a mounting opening 318 at one end of the first tubular member 311.

The measuring unit 32 includes an elastic member 321 disposed in the receiving space 313 and having a first end portion 324 and a second end portion 325 opposite to each other along the longitudinal direction (L2), an end plug 322 inserted into the mounting opening 318 to close the one end of the first tubular member 311, and a piston member 323 disposed in the receiving space 313 and connected to the second end portion 325 of the elastic member 321. The end plug 322 has a head portion 326 fixed to the one end of the first tubular member 311, and a shank portion 328 inserted into the first end portion 324 of the elastic member 321. When the elastic member 321 is retracted, only the second end portion 325 thereof will move relative to the first tubular member 311, while the first end portion 324 thereof is fixed and will not move. The piston member 323 has a free end 327 opposite to the end plug 322. The elastic member 321 is retracted when the free end 327 of the piston member 323 is pushed to move relative to the first tubular member 311 along the longitudinal direction (L2) by air entering the receiving space 313 from the flow guide channel 315.

The indicating unit 33 includes a graduated scale 331 that is provided on an outer surface 314 of the first tubular member 311, that extends along the longitudinal direction (L2) and that has a plurality of graduation marks 332. The graduated scale 331 faces the viewing window 224, and is used to indicate a position of the free end 327 of the piston member 323 relative to a corresponding one of the graduation marks 332.

To inflate an inflatable object using the air inflation device 100 of this disclosure, a user first rotates the switching unit 23 to the two-way inflation position, after which his/her two feet step on the foot plates 213 and his/her two hands grip the handgrip portions 225. Inflation operation can then be performed. When the user pulls up the handgrip portions 225, the piston structure 212 is raised, so that the volume of the first interior portion 218 is reduced, while the volume of the second interior portion 219 is increased, resulting in the generation of pressure difference between the first and second interior portions 218, 219. At this time, because the pressure in the first interior portion 218 is greater than the pressure in the second interior portion 219, the first valve members 52 will move downward, permitting air from the outside to enter the second passage 621 through a gap between the handgrip unit 22 and the piston rod 217. From the second passage 621, the air flows through the second valve chamber 512 and enters the second interior portion 219. Air compressed in the first interior portion 218 will flow through the first valve chamber 511 and enter the first passage 611. Finally, the air flows through the inflation hole 210 into the inflatable object through the inflation tube 9.

When the user pushes down the handgrip portions 225, the piston structure 212 is lowered, and the volume of the second interior portion 219 is reduced, while the volume of the first interior portion 218 is increased. Through the pressure difference between the first and second interior portions 218, 219, the second valve members 53 will move upward. At this time, air in the second interior portion 219 will enter the first passage 611 through the first valve chamber 511, and finally, flows through the inflation hole 210 into the inflatable object through the inflation tube 9. On the other hand, since air entering the second passage 621 will flow through the second valve chamber 512 and enter the first interior portion 218, the purpose of two-way inflation can be achieved.

Alternatively, the user may rotate the switching unit 23 to the one-way inflation position, and inflation of the inflatable object is made only when the piston structure 212 is lowered. When the piston structure 212 is raised, the inflatable object will not be inflated.

During inflation, the pressure measuring mechanism 3 can be used to measure air pressure in the inflatable object. Air in the interior space 214 of the cylinder 211 enters the flow guide channel 315 of the second tubular member 312 via the air inlet 316 thereof, and then flows through the air guide hole 317 into the receiving space 313 to push the free end 327 of the piston member 323, so that the piston member 323 can move along the longitudinal direction (L2) relative to the first tubular member 311 until a pushing force of the air applied on the measuring unit 32 and the elastic force of the elastic member 321 reach a balance. That is, when the pressure of the air and the pressure of the elastic member 321 on the piston member 323 reach equilibrium, the piston member 323 stops moving. At this time, the free end 327 of the piston member 323 can serve as an indicator, and the position of the free end 327 relative to the corresponding graduation mark 332 can be observed from the viewing window 224. Because the interior space 214 communicates with the receiving space 313, the interior space 214 also communicates with the inflatable object through the inflation hole 210, so that the air pressure of the receiving space 313 is equal to the air pressure of the inflatable object. The graduated scale 331 can thus serve as a pressure gauge, and the position of the free end 327 of the piston member 323 can indicate a measured pressure value of the inflatable object.

Figure 7:
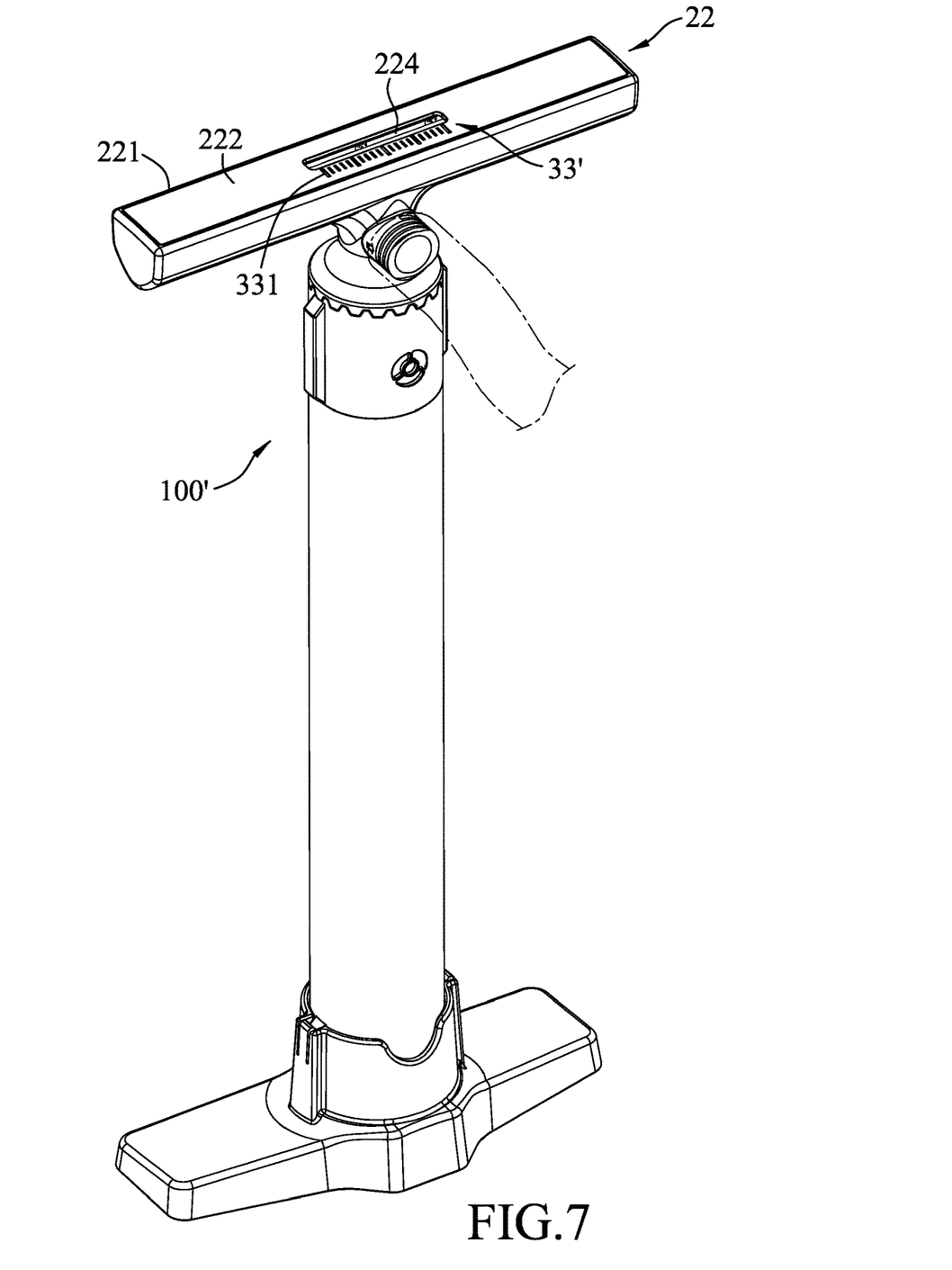
FIG. 7 is a perspective view of an air inflation device according to the second embodiment of the present disclosure.
Figure 8:
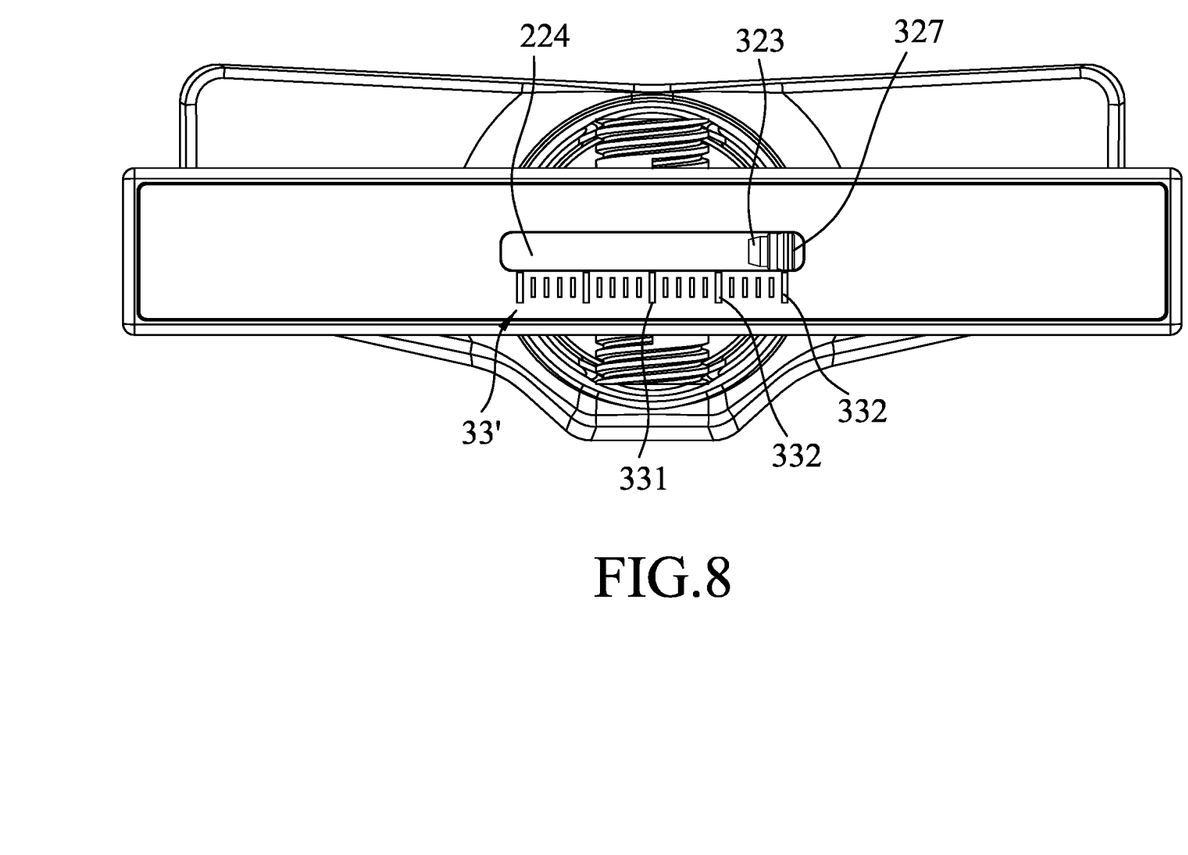
FIG. 8 is a schematic top view of the second embodiment.
Figure 9:
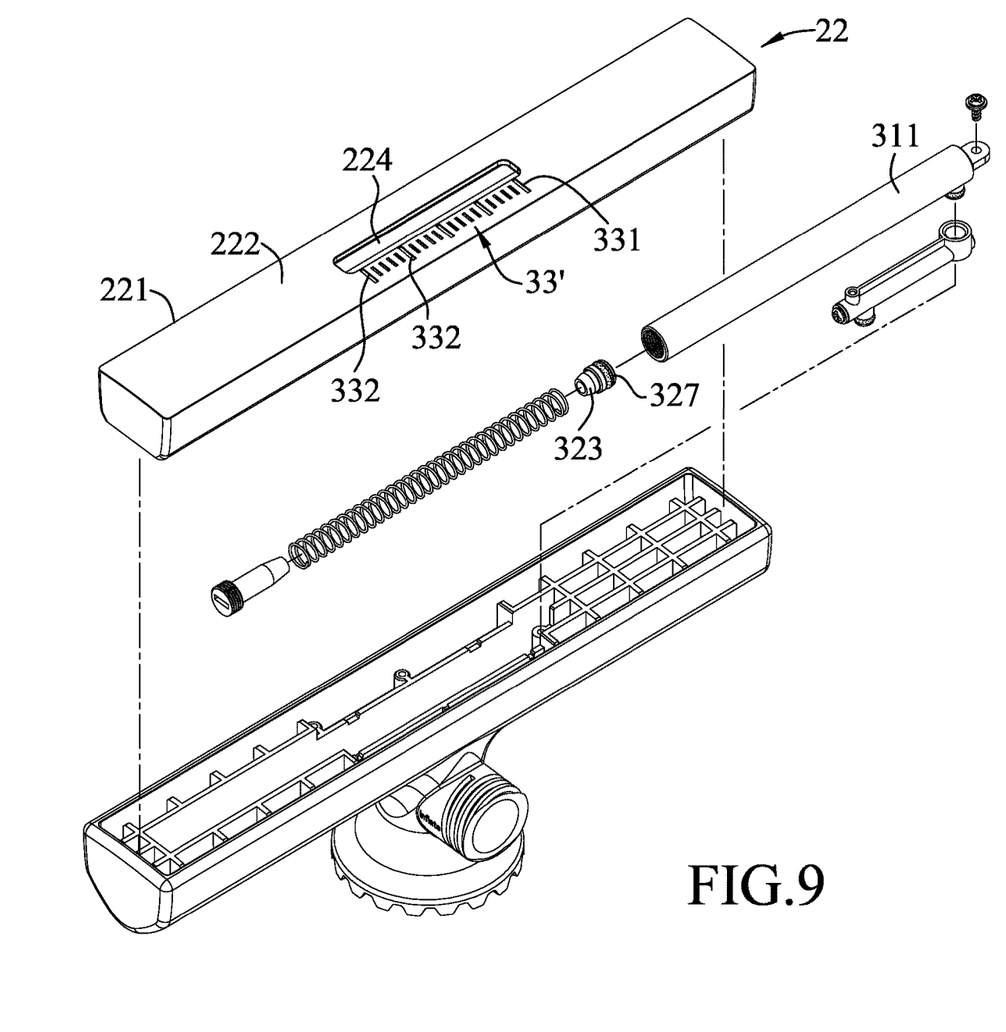
FIG. 9 is an exploded perspective view of a portion of the second embodiment.

Referring to FIGS. 7 to 9, the second embodiment of the air inflation device 100' according to this disclosure is shown to be identical to the first embodiment, and differs only in the structure of the indicating unit 33'. In the second embodiment, the graduated scale 331 of the indicating unit 33' is provided on the top surface 222 of the handgrip housing 221, and corresponds in position to the viewing window 224. Similarly, the position of the free end 327 of the piston member 323 relative to the corresponding graduation mark 332 of the graduated scale 331 can be observed from the viewing window 224 to show the measured pressure value of the inflatable object.

Figure 10:
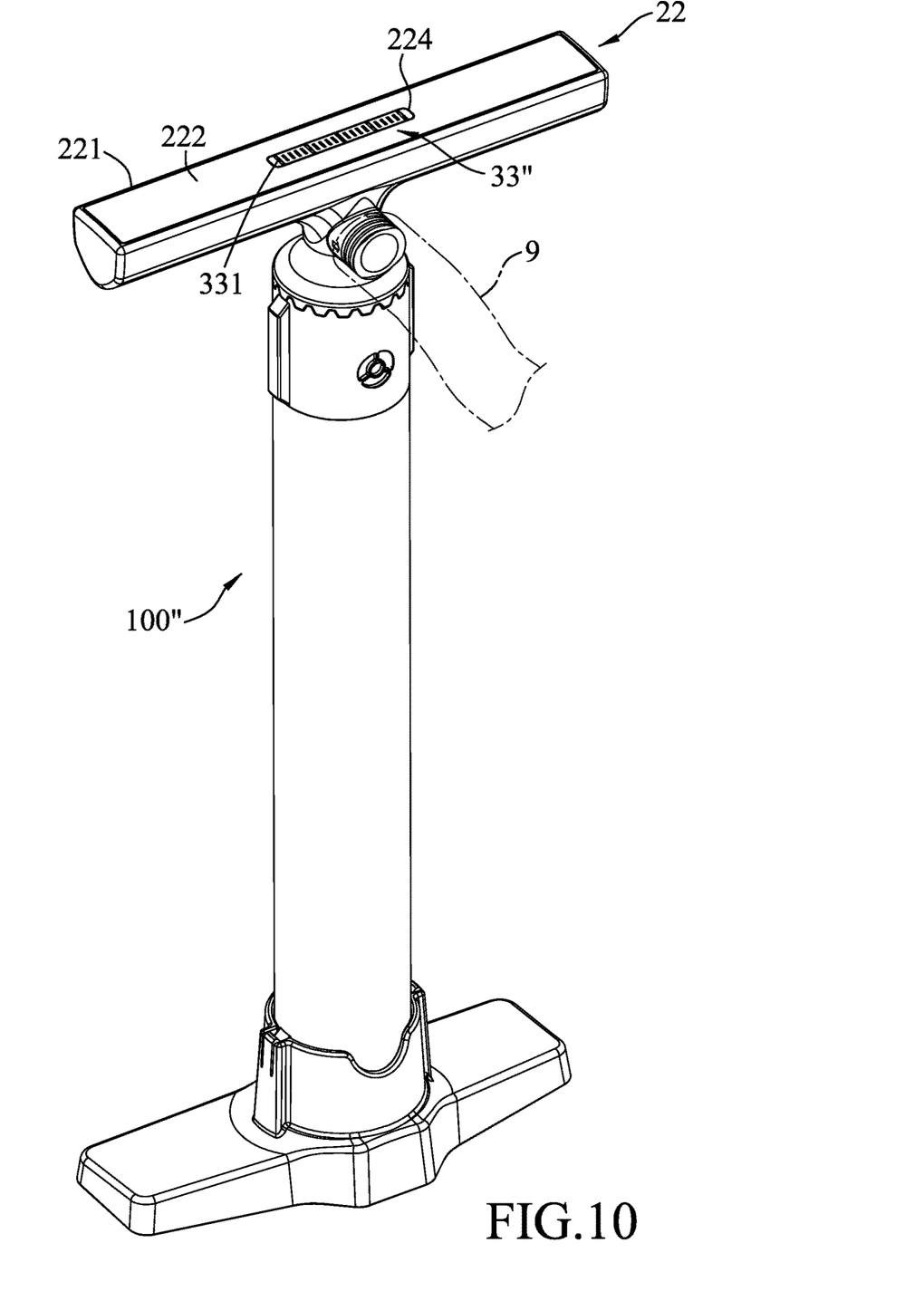
FIG. 10 is a perspective view of an air inflation device according to the third embodiment of the present disclosure.
Figure 11:
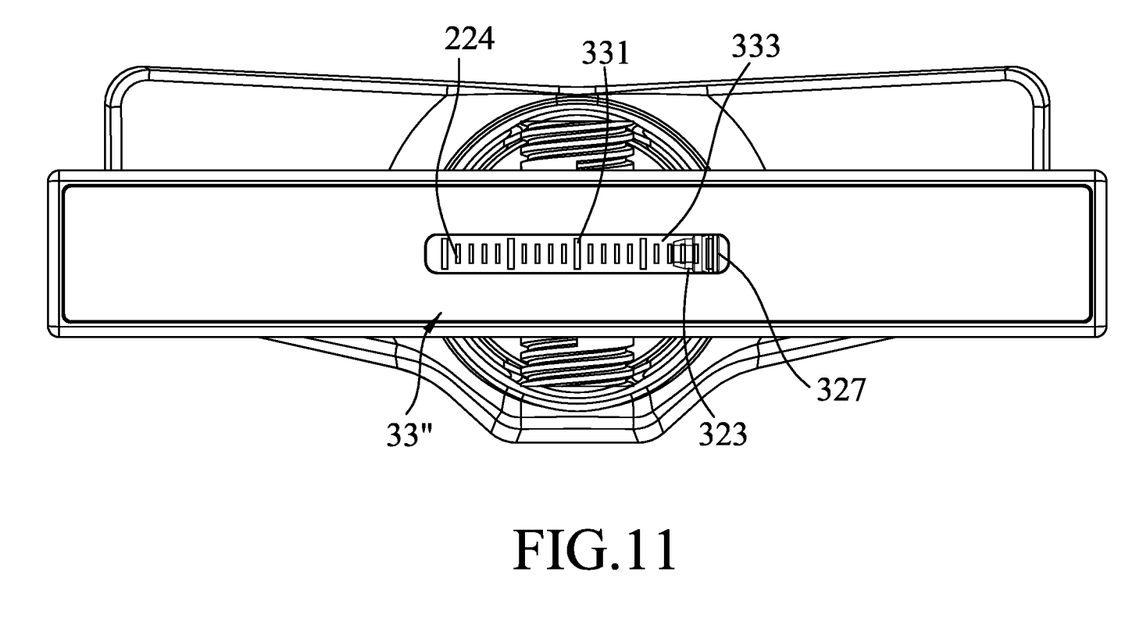
FIG. 11 is a schematic top view of the third embodiment.
Figure 12:
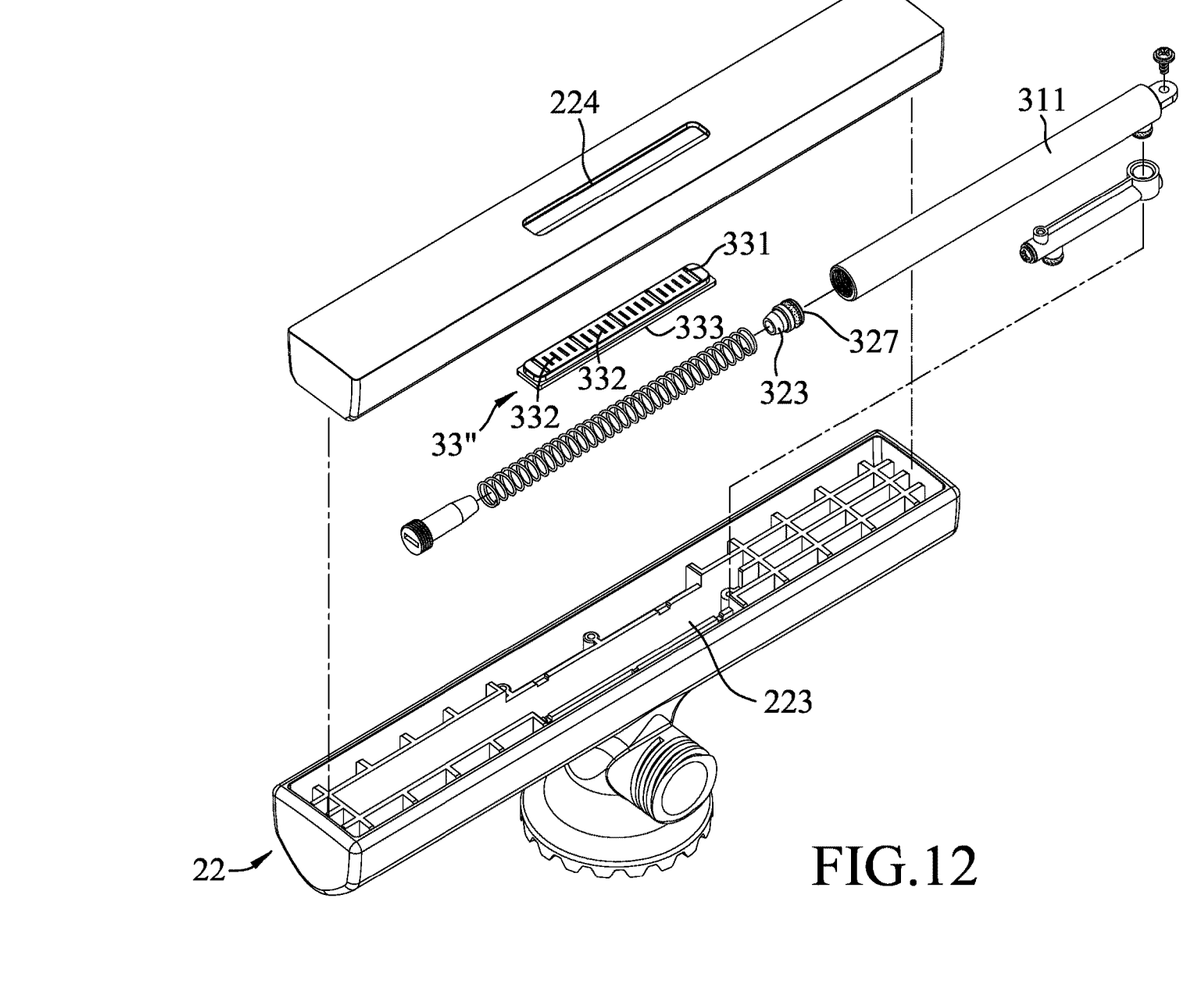
FIG. 12 is an exploded perspective view of a portion of the third embodiment.

Referring to FIGS. 10 to 12, the third embodiment of the air inflation device 100" according to this disclosure is shown to be identical to the first embodiment, and differs only in the structure of the indicating unit 33". In the third embodiment, the indicating unit 33" further includes a plate body 333 that is elongated, that is transparent, that is disposed in the mounting space 223 of the handgrip housing 221 and that is located between the first tubular member 311 and the viewing window 224. The graduated scale 331 is provided on the plate body 333. Through the indicating unit 33", the position of the free end 327 of the piston member 323 relative to the corresponding graduation mark 332 of the graduated scale 331 can also be observed from the viewing window 224 to show the measured pressure value of the inflatable object.

In summary, by using the novel design of the pressure measuring mechanism 3, in particular, the indicating unit 33, 33', 33" extending along the longitudinal direction (L2), the air inflation device 100, 100', 100' of this disclosure can facilitate the user to easily and directly observe and read in a straight line the pressure value of the inflatable object. Further, because the pressure measuring mechanism 3 is embedded in the handgrip unit 22 along the longitudinal direction (L2), a separate space for installation of the graduated scale 331 can be saved, so that the air inflation device 100, 100', 100" has a concise appearance. Moreover, if adjustment of the pressure range that can be measured by the pressure measuring mechanism 3 is desired, it is only necessary to replace the graduated scale 331 of the indicating unit 33, 33', 33" and the elastic member 321 with a specific elastic coefficient, and there is no need to greatly adjust the structure of each component. Therefore, the object of this disclosure can indeed be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An air inflation device suitable for inflating air into an inflatable object, comprising:
    an inflation mechanism including an inflation unit and a handgrip unit, said inflation unit defining an interior space and having an inflation hole for allowing air to be inflated into the inflatable object, said handgrip unit extending along a longitudinal direction and being connected to said inflation unit; and
    a pressure measuring mechanism disposed in said handgrip unit and including
        a flow guide unit including a first tubular member that defines a receiving space, and a second tubular member connected to said first tubular member and defining a flow guide channel, said flow guide channel having an air inlet communicating with said interior space, and an air guide hole communicating with said receiving space,
        a measuring unit including an elastic member that is retractable when pushed, an end plug fixed to said first tubular member and connected to said elastic member, and a piston member connected to said elastic member and having a free end that is pushed to move relative to said first tubular member along the longitudinal direction by air entering said receiving space from said flow guide channel, said free end being opposite to said end plug, said elastic member and said piston member being disposed in said receiving space, said elastic member being retracted when said free end is pushed by the air entering said receiving space, and
        an indicating unit extending along the longitudinal direction, provided on said first tubular member, and configured to indicate a position of said free end of said piston member of said measuring unit in said first tubular member;

wherein said first tubular member is transparent, said handgrip unit includes a handgrip housing having a viewing window, and said pressure measuring mechanism is disposed in said handgrip housing.

2. The air inflation device as claimed in claim 1, wherein said interior space extends along an axis transverse to the longitudinal direction, and said air inlet is located above said interior space and extends along the axis.

3. The air inflation device as claimed in claim 1, wherein said indicating unit includes a graduated scale provided on an outer surface of said first tubular member and having a plurality of graduation marks, and said viewing window permits viewing of the position of said free end of said piston member in said first tubular member relative to a corresponding one of said graduation marks.

4. The air inflation device as claimed in claim 1, wherein said indicating unit includes a graduated scale provided on a top surface of said handgrip housing and corresponding in position to said viewing window, said graduated scale having a plurality of graduation marks, said viewing window permitting viewing of the position of said free end of said piston member in said first tubular member relative to a corresponding one of said graduation marks.

5. The air inflation device as claimed in claim 1, wherein said indicating unit includes a plate body that is transparent and that is disposed between said first tubular member and said viewing window, and a graduated scale provided on said plate body and having a plurality of graduation marks, said viewing window permitting viewing of the position of said free end of said piston member in said first tubular member relative to a corresponding one of said graduation marks.

6. The air inflation device as claimed in claim 1, wherein said inflation unit includes a cylinder that extends along an axis and that defines said interior space, a piston structure disposed in said interior space, and two foot plates extending outwardly and oppositely from a bottom side of said cylinder, wherein said inflation hole is in a connecting portion which is disposed above said cylinder, said interior space having a top opening, said piston structure including a piston assembly disposed in said interior space, and a piston rod extending through said top opening and connected to said piston assembly for driving said piston assembly to move up and down in said interior space.

7. The air inflation device as claimed in claim 6, wherein said inflation hole is proximate to said handgrip unit.

* * * * *